United States Patent
Bingham et al.

(10) Patent No.: US 8,016,519 B2
(45) Date of Patent: Sep. 13, 2011

(54) INSTALLATION OF OFFSHORE STRUCTURES

(75) Inventors: Martin Bingham, Hexham (GB); Timothy William Grinsted, Stocksfield (GB); Michael John Watchorn, Stocksfield (GB)

(73) Assignee: IHC Engineering Business Limited (GB)

( * ) Notice: Subject to any disclaimer, the term of this patent is extended or adjusted under 35 U.S.C. 154(b) by 278 days.

(21) Appl. No.: 12/278,041

(22) PCT Filed: Feb. 6, 2007

(86) PCT No.: PCT/GB2007/000400
§ 371 (c)(1),
(2), (4) Date: Sep. 9, 2008

(87) PCT Pub. No.: WO2007/091042
PCT Pub. Date: Aug. 16, 2007

(65) Prior Publication Data
US 2009/0028647 A1    Jan. 29, 2009

(30) Foreign Application Priority Data

Feb. 6, 2006   (GB) .................................. 0602350.1
Feb. 7, 2006   (GB) .................................. 0602503.5

(51) Int. Cl.
*E02D 27/42*   (2006.01)
*E04H 12/34*   (2006.01)

(52) U.S. Cl. ........................................ 405/209; 405/204

(58) Field of Classification Search ....... 405/195.1–197, 405/203, 204, 209; 114/264, 265
See application file for complete search history.

(56) References Cited

U.S. PATENT DOCUMENTS

| 233,159 A | 10/1880 | Mooney |
| 259,685 A | 6/1882 | Haven et al. |
| 555,542 A | 3/1896 | Throop |
| 1,378,948 A | 5/1921 | Hage |
| 1,759,105 A | 5/1930 | Evans |

(Continued)

FOREIGN PATENT DOCUMENTS

CH        241601        3/1946

(Continued)

OTHER PUBLICATIONS

Great Britain Search Report dated Apr. 12, 2005 for International Application No. GB0503083.8.

(Continued)

*Primary Examiner* — Tara Mayo-Pinnock
(74) *Attorney, Agent, or Firm* — Ryan A. Schneider, Esq.; Troutman Sanders LLP

(57) ABSTRACT

A method and system for transporting an offshore structure such as a wind turbine generator includes a supporting frame in which the offshore structure is assembled on land in an upright configuration. The frame is used for lifting the structure onto a transport vessel, on which it is retained in the upright configuration. At its location of use, the offshore structure is transferred to a pre-prepared foundation. The foundation is provided with a frame which cooperates with the supporting frame. The supporting frame includes a plurality of legs having hydraulically controlled feet. The frame of the foundation includes an equal number of supporting formations on which the feet ultimately rest. The feet are moveable in response to the hydraulic control along a nominally vertical line of action and provide a damping arrangement for the mounting of the offshore structure.

15 Claims, 16 Drawing Sheets

U.S. PATENT DOCUMENTS

| | | | |
|---|---|---|---|
| 2,527,653 A | 10/1950 | Pierce | |
| 2,896,564 A | 7/1959 | Wright | |
| 2,955,299 A | 10/1960 | Ingram, Jr. | |
| 3,004,391 A | 10/1961 | Miller | |
| 3,008,158 A | 11/1961 | Stinson | |
| 3,152,568 A | 10/1964 | Mayer | |
| 3,216,639 A | 11/1965 | Castela | |
| 3,237,414 A | 3/1966 | Straub et al. | |
| 3,372,849 A | 3/1968 | Hall et al. | |
| 3,503,512 A | 3/1970 | Desty et al. | |
| 3,589,580 A | 6/1971 | Smulders | |
| 3,608,316 A | 9/1971 | Manuel | |
| 3,638,288 A | 2/1972 | Pryor | |
| 3,692,144 A | 9/1972 | Summer et al. | |
| 3,716,994 A | 2/1973 | Pogonowski | |
| 3,739,971 A | 6/1973 | Silvestri et al. | |
| 3,747,354 A | 7/1973 | Macomber | |
| 3,788,396 A | 1/1974 | Shatto, Jr. et al. | |
| 3,808,625 A | 5/1974 | Fowler | |
| 4,027,486 A | 6/1977 | Dougherty | |
| 4,073,155 A | 2/1978 | Schiemichen | |
| 4,083,072 A | 4/1978 | Ryan | |
| 4,133,067 A | 1/1979 | Bennett et al. | |
| 4,133,283 A | 1/1979 | Ryan | |
| 4,162,551 A | 7/1979 | Serrano | |
| 4,169,296 A | 10/1979 | Wipkink et al. | |
| 4,222,683 A | 9/1980 | Schaloske et al. | |
| 4,285,454 A | 8/1981 | Plumettaz | |
| 4,286,346 A | 9/1981 | Wiek | |
| 4,333,196 A | 6/1982 | Bougaran | |
| 4,363,150 A | 12/1982 | Nilsson | |
| 4,366,591 A | 1/1983 | Zimmerman | |
| 4,369,538 A | 1/1983 | Smedal | |
| 4,406,094 A | 9/1983 | Hempel et al. | |
| 4,459,931 A | 7/1984 | Glidden | |
| 4,521,132 A | 6/1985 | Isakson et al. | |
| 4,581,784 A | 4/1986 | Rousseau et al. | |
| 4,590,634 A | 5/1986 | Williams | |
| 4,596,494 A | 6/1986 | Manesse et al. | |
| 4,602,697 A | 7/1986 | Aanensen | |
| 4,611,953 A | 9/1986 | Owens | |
| 4,655,641 A | 4/1987 | Weyler | |
| 4,720,214 A | 1/1988 | Brasted et al. | |
| 4,721,412 A | 1/1988 | King et al. | |
| 4,744,698 A * | 5/1988 | Dallimer et al. | 405/226 |
| 4,789,271 A | 12/1988 | Sullaway et al. | |
| 4,869,615 A | 9/1989 | Galle | |
| 4,872,782 A | 10/1989 | Streichenberger | |
| 4,902,169 A | 2/1990 | Sutton | |
| 4,917,540 A | 4/1990 | Recalde | |
| 5,020,940 A | 6/1991 | Smith | |
| 5,126,134 A | 6/1992 | Heim et al. | |
| 5,263,624 A | 11/1993 | Zuidberg | |
| 5,309,990 A * | 5/1994 | Lance | 166/77.3 |
| 5,800,093 A | 9/1998 | Khachaturian | |
| 5,860,379 A | 1/1999 | Moody | |
| 5,893,682 A | 4/1999 | Oliveri | |
| 5,950,267 A | 9/1999 | Ricci, Jr. | |
| 6,131,224 A | 10/2000 | Bernal | |
| 6,131,528 A | 10/2000 | Meek et al. | |
| 6,347,424 B1 | 2/2002 | Vatne | |
| 6,408,780 B1 | 6/2002 | Ozaki et al. | |
| 6,409,428 B1 | 6/2002 | Moog | |
| 6,425,441 B2 | 7/2002 | Shaaban et al. | |
| 6,425,708 B1 | 7/2002 | Siegfriedsen | |
| 6,435,795 B1 * | 8/2002 | Brady | 414/138.4 |
| 6,439,445 B1 | 8/2002 | De Groot et al. | |
| 6,592,416 B1 | 7/2003 | Hochschild, III | |
| 6,619,432 B1 | 9/2003 | Yasui | |
| 6,651,858 B2 | 11/2003 | Shen | |
| 6,739,430 B2 | 5/2004 | Hill | |
| 6,745,714 B1 | 6/2004 | Faber | |
| 6,923,140 B1 | 8/2005 | Cook | |
| 7,021,510 B2 | 4/2006 | Ellingson | |
| 7,025,332 B2 | 4/2006 | Rincoe | |
| 7,103,935 B2 | 9/2006 | Hill | |
| 7,112,010 B1 * | 9/2006 | Geiger | 405/195.1 |
| 7,178,708 B2 | 2/2007 | Grinsted | |
| 7,234,409 B2 * | 6/2007 | Hansen | 114/258 |
| 7,377,412 B2 | 5/2008 | Grinsted | |
| 7,686,543 B2 * | 3/2010 | They | 405/224 |
| 2001/0040031 A1 | 11/2001 | Shaaban et al. | |
| 2002/0085883 A1 | 7/2002 | Meyers et al. | |
| 2003/0182741 A1 | 10/2003 | Prins | |
| 2003/0217681 A1 | 11/2003 | Funk | |
| 2004/0045226 A1 | 3/2004 | Dehlsen et al. | |
| 2004/0115006 A1 * | 6/2004 | Facey et al. | 405/203 |
| 2004/0190999 A1 * | 9/2004 | Wybro et al. | 405/203 |
| 2005/0158125 A1 * | 7/2005 | Thomas et al. | 405/203 |
| 2005/0179019 A1 | 8/2005 | Ellingson | |
| 2005/0286979 A1 | 12/2005 | Watchorn | |
| 2006/0078385 A1 | 4/2006 | Watchorn | |
| 2006/0086305 A1 * | 4/2006 | Merchant et al. | 114/265 |
| 2006/0120809 A1 * | 6/2006 | Ingram et al. | 405/195.1 |
| 2006/0153644 A1 | 7/2006 | Grinsted | |
| 2006/0208245 A1 | 9/2006 | Diehl | |
| 2007/0119896 A1 | 5/2007 | Grinsted | |
| 2008/0145149 A1 | 6/2008 | Grinsted et al. | |
| 2008/0188148 A1 | 8/2008 | Simon-Bouhet | |
| 2008/0229524 A1 | 9/2008 | Watchorn et al. | |
| 2008/0240863 A1 * | 10/2008 | Altman et al. | 405/196 |
| 2008/0247827 A1 * | 10/2008 | Altman et al. | 405/197 |
| 2008/0289126 A1 | 11/2008 | Stapel | |
| 2008/0301888 A1 | 12/2008 | Watchorn et al. | |
| 2009/0028647 A1 * | 1/2009 | Bingham et al. | 405/195.1 |
| 2009/0050045 A1 | 2/2009 | Grimaldi | |
| 2009/0191002 A1 * | 7/2009 | Stubler et al. | 405/209 |
| 2009/0208294 A1 * | 8/2009 | Yao et al. | 405/196 |
| 2010/0143046 A1 * | 6/2010 | Olsen et al. | 405/209 |
| 2010/0150660 A1 * | 6/2010 | Nadarajah et al. | 405/196 |
| 2010/0224114 A1 * | 9/2010 | Coppens | 114/61.13 |

FOREIGN PATENT DOCUMENTS

| | | |
|---|---|---|
| CH | 363463 | 7/1962 |
| DE | 597543 | 5/1934 |
| DE | 2341846 | 2/1975 |
| DE | 19607972 | 1/1998 |
| DE | 10249779 | 5/2004 |
| EP | 0255191 | 2/1988 |
| EP | 0296272 | 12/1988 |
| EP | 0524648 | 1/1993 |
| EP | 1101935 | 5/2001 |
| EP | 1209028 | 5/2002 |
| FR | 2465640 | 3/1981 |
| FR | 2586641 | 3/1987 |
| GB | 1136971 A | 12/1968 |
| GB | 1236447 A | 6/1971 |
| GB | 2001121 A | 1/1979 |
| GB | 2033463 | 5/1980 |
| GB | 2086313 | 5/1982 |
| GB | 2115361 A | 9/1983 |
| GB | 2156744 | 10/1985 |
| GB | 2158793 | 11/1985 |
| GB | 2167714 A | 6/1986 |
| GB | 2175332 | 11/1986 |
| GB | 2175860 | 12/1986 |
| GB | 2225753 | 6/1990 |
| GB | 2225753 A | 6/1990 |
| GB | 2246992 | 2/1992 |
| GB | 2390632 | 1/2004 |
| JP | 55091488 A | 7/1980 |
| JP | 61211409 A | 9/1986 |
| JP | 06002317 | 1/1994 |
| JP | 2005069025 | 3/2005 |
| JP | 2006037397 | 2/2006 |
| NL | 1019706 | 7/2003 |
| NL | 1023142 | 10/2004 |
| SU | 610718 | 6/1978 |
| SU | 757383 | 8/1980 |
| WO | WO 85/01970 | 5/1985 |
| WO | 88/03107 A1 | 5/1988 |
| WO | WO 95/14605 | 6/1995 |
| WO | WO/97/29946 | 8/1997 |
| WO | 0161114 A1 | 8/2001 |
| WO | WO 02/20343 | 3/2002 |
| WO | WO 02/48547 | 6/2002 |
| WO | WO 03/066426 | 8/2003 |

| WO | WO 03/066427 | 8/2003 |
| WO | WO 2004/038108 | 5/2004 |
| WO | WO 2004/040182 | 5/2004 |
| WO | 2004070119 | 8/2004 |
| WO | WO 2004/083529 | 9/2004 |
| WO | WO 2005/047097 | 5/2005 |
| WO | WO 2006/013342 | 2/2006 |
| WO | WO 2006/076920 | 7/2006 |
| WO | WO 2006/087540 | 8/2006 |
| WO | WO 2007/015079 | 2/2007 |

OTHER PUBLICATIONS

Great Britain Search Report dated Apr. 26, 2006 for British Application No. GB0602503.5.

Great Britain Search Report for Application No. GB 0224656.9 Dated Nov. 22, 2002.

Great Britain Search Report for Application No. GB 0225496.9 Dated Apr. 28, 2003.

Great Britain Search Report for Application No. GB 403362.7 Dated Jun. 29, 2004.

Great Britain Search Report for related Application No. GB0515800.1 dated Nov. 11, 2005.

Great Britain Examination Report for related Application No. GB0515800.1 dated Dec. 5, 2008.

Great Britain Combined Search and Examination Report for related Application No. GB0807877.6 dated Nov. 10, 2010.

International Search Report for PCT Application No. PCT/GB03/04529 Dated Feb. 11, 2004.

International Search Report for PCT Application No. PCT/GB03/04697 Dated Apr. 22, 2004.

International Search Report for PCT Application No. PCT/GB04/01208 Dated Jul. 19, 2004.

International Search Report for PCT Application No. PCT/GB04/04716 Dated Feb. 23, 2005.

International Search Report for PCT Application No. PCT/GB05/03010 Dated Nov. 22, 2005.

International Search Report, IPER and Written Opinion for PCT Application No. PCT/GB06/00525 Dated May 19, 2006.

International Search Report for PCT Application No. PCT/GB06/02860 Dated Oct. 26, 2006.

International Search Report, IPER and Written Opinion for PCT Application No. PCT/GB07/00400 Dated Jun. 11, 2007.

* cited by examiner

INSTALLATION OF OFFSHORE STRUCTURES

BENEFIT CLAIMS

This application is a US National Stage of International Application No. PCT/GB2007/000400, filed 6 Feb. 2007, which claims the benefit of both GB 0602350.1, filed 6 Feb. 2006, and GB 0602503.5, filed 7 Feb. 2006.

The present invention relates to methods and apparatus for the installation of offshore structures, and in particular offshore structures such as wind turbine generators. The invention also relates to methods and apparatus for transporting wind turbine generators and similar offshore structures to their location of use offshore.

BACKGROUND

Mounting large structures such as wind turbine generators in offshore locations involves a number of complexities. Because of the size of the structures they are inherently difficult to transport and there are significant handling issues in achieving a correct alignment of the structure with its offshore support base, jacket or foundation. These difficulties are aggravated when the sea conditions are less than ideal. In relatively shallow waters it is possible to use so-called jack-up barges which, when the jacks are extended to at least partially support the barge on the seabed, provide a stable platform from which the offshore structure can be mounted on its offshore support base. However, it is increasingly required to mount structures such as wind turbines in deeper water where jack-up barges cannot operate. The present invention seeks to provide a method and apparatus which is particularly suitable for the mounting of offshore structures in deeper waters and further which is especially suitable for mounting tall structures or relatively small width, such as wind turbine generators.

More especially, the present invention seeks to provide a system or construction in the form of co-operating apparatus, and a method, by which an offshore structure such as a wind turbine generator can be fully assembled on shore, lifted onto a transporting vessel such as a floating crane barge and moved on the vessel to its final installation position whereat the offshore structure is transferred from the vessel and mounted on a pre-installed foundation or jacket. The system of the invention transports the offshore structure in an upright configuration. In the case of a WTG (and similarly for other tall, narrow offshore structures which typically include a shaft, mast or tower which is arranged vertically in use), the WTG is relatively delicate and is also stiff in the longitudinal (vertical) direction. This makes it especially important to avoid shocks when mounting the WTG on its offshore foundation. Usually, the centre of gravity of structures such as WTGs is at a height which is more than twice the width of the base of the structure so that in handling the structure in an upright configuration, instability of the structure is a major concern.

BRIEF SUMMARY OF THE DISCLOSURE

According to a first aspect of the present invention there is provided apparatus for use in supporting an offshore structure including a longitudinally extensive shaft, mast or tower, the apparatus comprising:

a frame including an engaging portion configured to engage the shaft, mast or tower, a plurality of legs configured to rest on an underlying supporting surface and a plurality of lifting formations by which the frame may operatively be lifted, the frame being configured to support and carry the offshore structure with the shaft, mast or tower in a substantially upright condition.

Preferably each leg includes an adjustable foot, each foot being moveable between an extended condition and a retracted condition and wherein the apparatus further comprises a control arrangement operable to control the movement of each foot.

Preferably each foot moves along a line of action, the lines of action of the respective feet being parallel and nominally vertical when the offshore structure is supported with the shaft, mast or tower in its substantially upright condition.

According to a second aspect of the present invention there is provided apparatus for transporting an offshore structure including a longitudinally extensive shaft, mast or tower and for mounting the offshore structure on an offshore support base, the apparatus comprising:

a frame including an engaging portion configured to engage the shaft, mast or tower, a plurality of legs configured to rest on an underlying supporting surface and a plurality of lifting formations by which the frame may operatively be lifted, the frame being configured to support and carry the offshore structure with the shaft, mast or tower in a substantially upright condition a transporting vessel, a pair of lifting cranes mounted on the vessel, the lifting cables of the cranes being operatively connected to the lifting formations of the frame, whereby the offshore structure, carried in the frame may operatively be lifted from land onto the vessel.

Preferably the apparatus further comprises a spreader beam operatively arranged above the centre of gravity of the combined offshore structure and frame, the spreader beam being attached to the lifting cables of the crane and operatively moveable with respect to the longitudinal dimension of the shaft, mast or tower.

Most preferably the shaft, mast or tower of the offshore structure passes through the spreader beam.

Preferably each leg includes an adjustable foot, each foot being moveable between an extended condition and a retracted condition and wherein the apparatus further comprises a control arrangement operable to control the movement of each foot.

Preferably each foot moves along a line of action, the lines of action of the respective feet being parallel and nominally vertical when the offshore structure is supported with the shaft, mast or tower in its upright condition.

According to a third aspect of the invention there is provided an offshore support apparatus for use in mounting in or on an offshore foundation an offshore structure including a longitudinally extensive shaft, mast or tower, the offshore structure being operatively carried with the shaft, mast or tower in a substantially upright condition in a frame including an engaging portion configured to engage the shaft, mast or tower, a plurality of legs configured to rest on an underlying supporting surface and a plurality of lifting formations by which the frame may operatively be lifted, the offshore support apparatus comprising attachment means configured operatively to attach the offshore support apparatus to the offshore foundation, a support frame depending from the attachment means and a plurality of supporting formations equal in number to the number of legs of the frame and configured to support respective legs of the frame.

According to a fourth aspect of the present invention there is provided a system for mounting, in or on an offshore foundation, an offshore structure including a longitudinally extensive shaft, mast or tower, the system comprising:
- a frame including an engaging portion configured to engage the shaft, mast or tower, a plurality of legs configured to rest on an underlying supporting surface and a plurality of lifting formations by which the frame may operatively be lifted, the frame being configured to support and carry the offshore structure with the shaft, mast or tower in a substantially upright condition; and
- an offshore support apparatus comprising attachment means configured operatively to attach the offshore support apparatus to the offshore foundation, a support frame depending from the attachment means and a plurality of supporting formations equal in number to the number of legs of the frame and configured to support respective legs of the frame.

Preferably the system further comprises:
- a transporting vessel; and
- a pair of lifting cranes mounted on the vessel, the lifting cables of the cranes being operatively connected to the lifting formations of the frame, whereby the offshore structure, carried by the frame, may operatively be lifted from land onto the vessel and from the vessel onto the offshore support foundation.

Preferably the system further comprises a spreader beam operatively arranged above the centre of gravity of the combined offshore structure and frame, the spreader beam being attached to the lifting cables of the crane and operatively moveable with respect to the longitudinal dimension of the shaft, mast or tower.

Preferably the shaft, mast or tower of the offshore structure passes through the spreader beam.

Preferably each leg includes an adjustable foot, each foot being moveable between an extended condition and a retracted condition and wherein the frame further comprises a control arrangement operable to control the movement of each foot, the feet of the frame and the supporting formations of the offshore support apparatus being configured so that the feet are supported by the supporting formations when the offshore structure is mounted in its operative position.

Preferably each foot moves along a line of action, the lines of action of the respective feet being parallel and nominally vertical when the offshore structure is supported with the shaft, mast or tower in its substantially upright condition.

Preferably the offshore support apparatus further includes alignment means which operatively cooperate with the frame to assist in the alignment the legs and the supporting formations.

According to a fifth aspect of the invention there is provided a method of mounting an offshore structure including a longitudinally extensive shaft, mast or tower on a transporting vessel, the method comprising:
- providing on land a frame including an engaging portion configured to engage the shaft, mast or tower, a plurality of legs configured to rest on an underlying supporting surface and a plurality of lifting formations by which the frame may operatively be lifted,
- securing the frame to the offshore structure;
- providing a pair or lifting cranes on the transporting vessel, each crane having a lifting cable;
- connecting the lifting cables to the lifting formations of the frame; and
- lifting the frame carrying the offshore structure from the land to the vessel such that at least some of the legs are supported by the deck of the vessel and the offshore structure is retained in a substantially upright condition at least partially by the action of the cranes.

Preferably the method of the fifth aspect of the invention further comprises:
- before the step of lifting the frame, providing a spreader beam, mounting the spreader beam on the shaft, mast or tower and attaching the lifting cables of the cranes to the spreader beam such that the spreader beam may operatively be moved longitudinally with respect to the shaft, mast or tower;

According to a sixth aspect of the present invention there is provided a method of transferring an offshore structure including a longitudinally extensive shaft mast or tower from a transporting vessel to an offshore support foundation, the method comprising
providing:
- a tower supporting apparatus including a frame arranged on the vessel and supporting the offshore structure, the frame comprising an engaging portion which engages the shaft, mast or tower, a plurality of legs at least some of which are supported on the deck of the vessel and a plurality of lifting formations by which the frame may operatively be lifted;
- a pair or lifting cranes on the transporting vessel, each crane having a lifting cable connected to the lifting formations of the frame;
- a spreader beam mounted on the shaft, mast or tower and to which the lifting cables of the cranes are attached, the spreader beam being operatively moveable longitudinally with respect to the shaft, mast or tower;
- an offshore support apparatus comprising attachment means by which the offshore support apparatus is attached to the offshore foundation, a support frame depending from the attachment means and a plurality of supporting formations equal in number to the number of legs of the frame and configured to support respective legs of the frame the method comprising:
- lifting the tower supporting apparatus and offshore structure from the vessel with the cranes and retaining the offshore structure with the shaft, mast or tower in a substantially upright configuration;
- moving the tower supporting apparatus carrying the offshore structure to a position above the offshore support foundation and aligning the legs of the frame with the support structures of the offshore support apparatus;
- lowering the offshore structure onto the offshore support base such that the legs are supported by the supporting formations of the offshore support apparatus;
- and securing the offshore structure to the offshore support apparatus.

Preferably in this method each leg includes an adjustable foot, each foot being moveable between an extended condition and a retracted condition and wherein the frame further comprises a control arrangement operable to control the movement of each foot, and the method further comprises:
- allowing each foot to extend and retract substantially freely as the offshore structure is lowered to the offshore support apparatus until each foot remains in contact with the corresponding support formation of the offshore support apparatus; and
- adjusting the control arrangement such that retraction of the feet is restricted or prevented, whereby the load of the offshore structure is transferred to the offshore support apparatus.

BRIEF DESCRIPTION OF THE DRAWINGS

For a better understanding of the invention and to show how the same may be carried into effect, reference will now be made by way of example only to the following drawings in which.

DETAILED DESCRIPTION

Figure 1A:
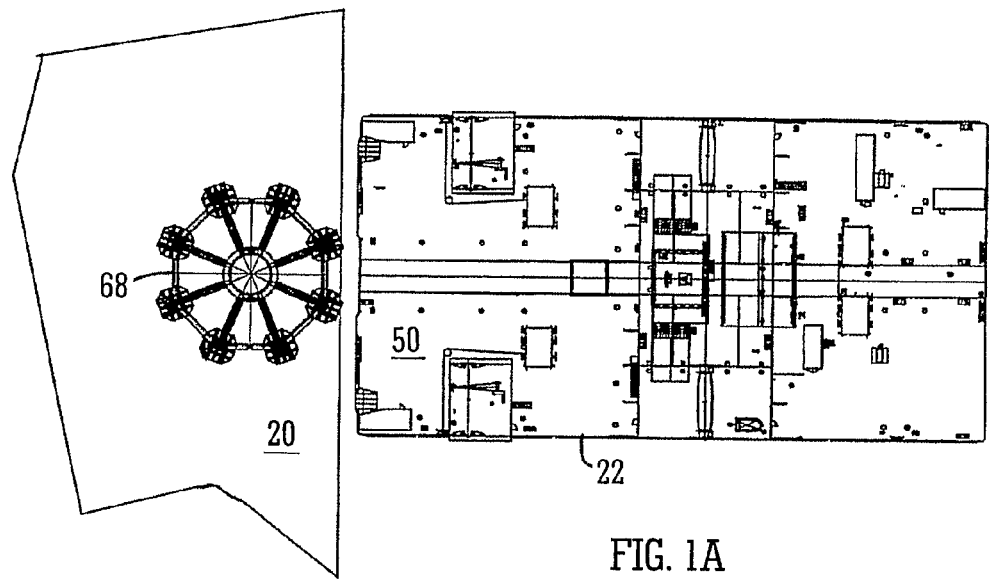
FIGS. 1A and 1B show respectively plan and side views of a construction according to the invention, prior to lifting of the offshore structure.
Figure 1B:
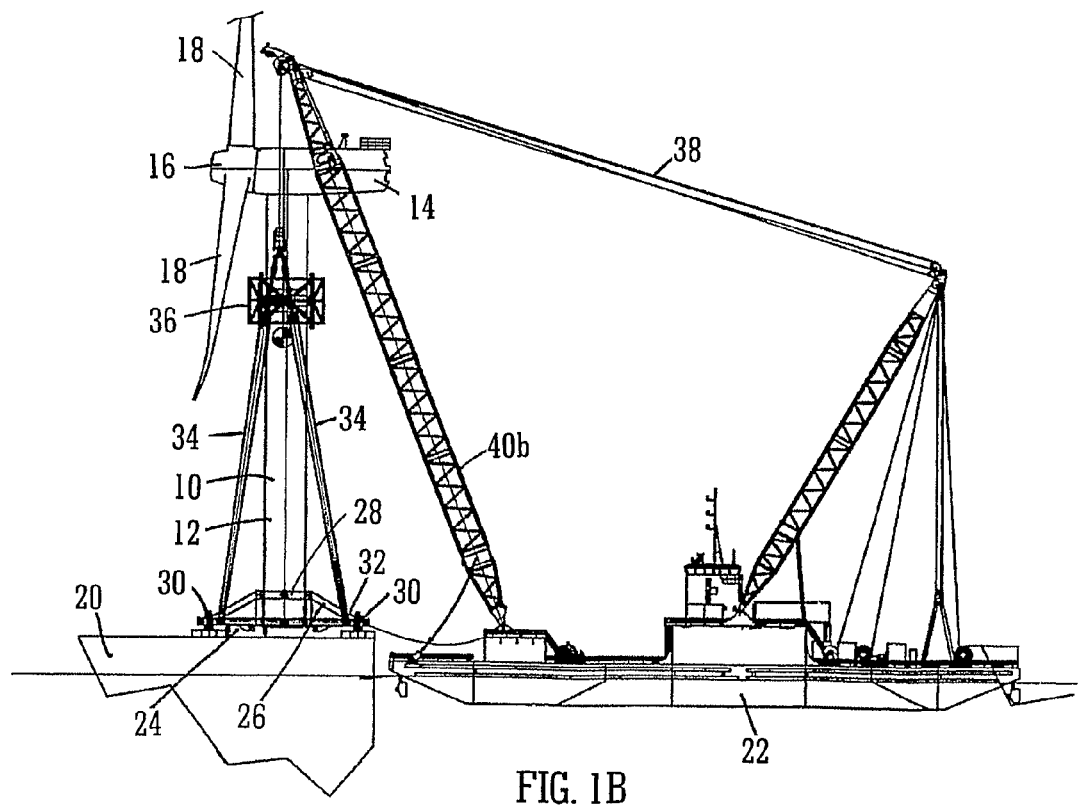

In the following description, the offshore structure is referred to for convenience as a WTG. It will be appreciated, however that the method, system and apparatus of the invention may be applied to the installation of other offshore structures. Referring now to the drawings, the offshore structure 10 is illustrated as a wind turbine generator which comprises a tower 12, a nacelle 14 housing generator components and a rotor 16 with blades 18. The WTG 10 is constructed on land and assembled at a quayside 20 from where it is collected by a transporting vessel 22. At the quayside 20 the WTG is supported in its upright configuration (as shown in FIG. 1) by a tower supporting apparatus 24 which includes a frame 26 which surrounds the tower 12 and has portions 28 which engage a lower part of the tower 12.

In operation, typically the frame 26 is assembled at the quayside 20. The frame 26 may conveniently comprise one or more sub-frame portions which are joined together at the quayside 20 to form the final frame 26. The tower 12 may initially be assembled or resting in a configuration in which its longitudinal axis is nominally parallel to the ground and is lifted with suitable lifting apparatus such as one or more cranes and, if necessary, turned into its upright configuration. The tower 12 is then mounted in the frame 26 and the frame 26 is secured to the tower 12, such as by joining together of the sub-frame portions and/or bolting the frame 26 to the tower 12. The frame 26 includes a plurality of legs 30 on which the frame rests 26 when on the quayside 20. Preferably the legs are evenly spaced apart. Conveniently the legs 30 lie on a circle of diameter of the order of 15 m to 25 m, most preferably about 20 m to 22 m. The frame 26 further comprises a number of lifting attachments 32 to which lifting cables or slings 34 may be attached for lifting the frame 26 and the tower 12. In addition to acting to support the WTG 10 during its assembly on the quayside 20, the tower supporting apparatus is advantageous in that the centre of gravity of the combined WTG 10 and tower supporting apparatus 24 is lower than that of the WTG 10 alone. This in itself facilitates handling of the WTG 10.

Figure 12:
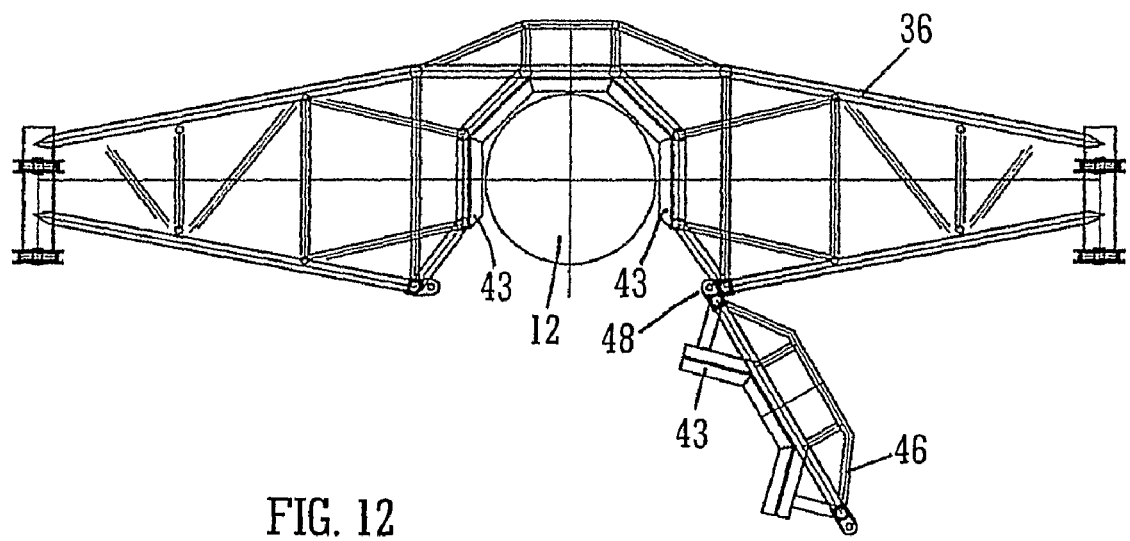
FIG. 12 shows the spreader beam of FIG. 11 in a condition for mounting on or removal from the shaft, mast or tower of the offshore structure.

A spreader beam 36 is also provided. The spreader beam 36 forms a wide rigid connection which gives stability to the WTG 10 during lifting. For lifting and transporting of the WTG 10, lifting cables 38 of a pair of cranes 40a, 40b mounted on the transporting vessel 22 are attached to opposed marginal portions of the spreader beam 36. The spreader beam 36 is of framework construction and is mounted on the tower 12 of the WTG 10. The spreader beam 36 and includes an internal passage 42 in which the tower 12 of the WTG 10 is disposed in use. Contact between the spreader beam 36 and the tower 12 is by slider pads, rubber coated rollers or like means 43 configured to avoid, or at least minimise any surface damage to the tower 12. These pads or rollers 43 are arranged at the internal face of the passage 42. A nominal clearance of about 50 mm is provided between the pads or rollers 43 and the WTG tower 12. For mounting the spreader beam 36 on the tower 12, the spreader beam 36 may be provided in two parts which are joined together around the tower 12. Alternatively, as illustrated in FIG. 12, the spreader beam 36 may include an opening section 46 which is moveable about a hinge 48. Thus the spreader beam 36 is offered up to the tower 12 with the section 48 in its open condition until the tower 12 is located within the internal passage 42. The section 46 is then moved about the hinge 48 into its closed condition in which the spreader beam 36 enclosed the tower 12 in the internal passage 42. The section 46 is then secured in its closed condition.

Under the control of the lifting cables 38, the spreader beam can be raised or lowered with respect to the tower 12, that is, the spreader beam 36 can be moved parallel to the longitudinal axis of the tower 12. In a typical mode of operation, the spreader beam 36 has a rest position at the lower end of the tower 12, on or immediately above the frame 26. With the spreader beam in this rest position, the remaining parts of the WTG, namely the nacelle 14 and the rotor 16 with blades 18, are conveniently mounted on the WTG tower 12. The WTG 10 is then ready for lifting onto the transporting vessel 22.

For lifting the WTG 10, the spreader beam is raised to its operating position, which is above the combined centre of gravity of the WTG 10 and tower supporting apparatus 24 (which includes frame 2 and legs 30). Typically, the spreader beam is arranged about 5 m above the combined centre of gravity. The centre of gravity is indicated schematically at 44 in FIG. 1. If not already in place, lift cables or slings 34 are then connected between devises on the lower face of the spreader beam and the lifting attachments 32 of the frame.

Figure 2:
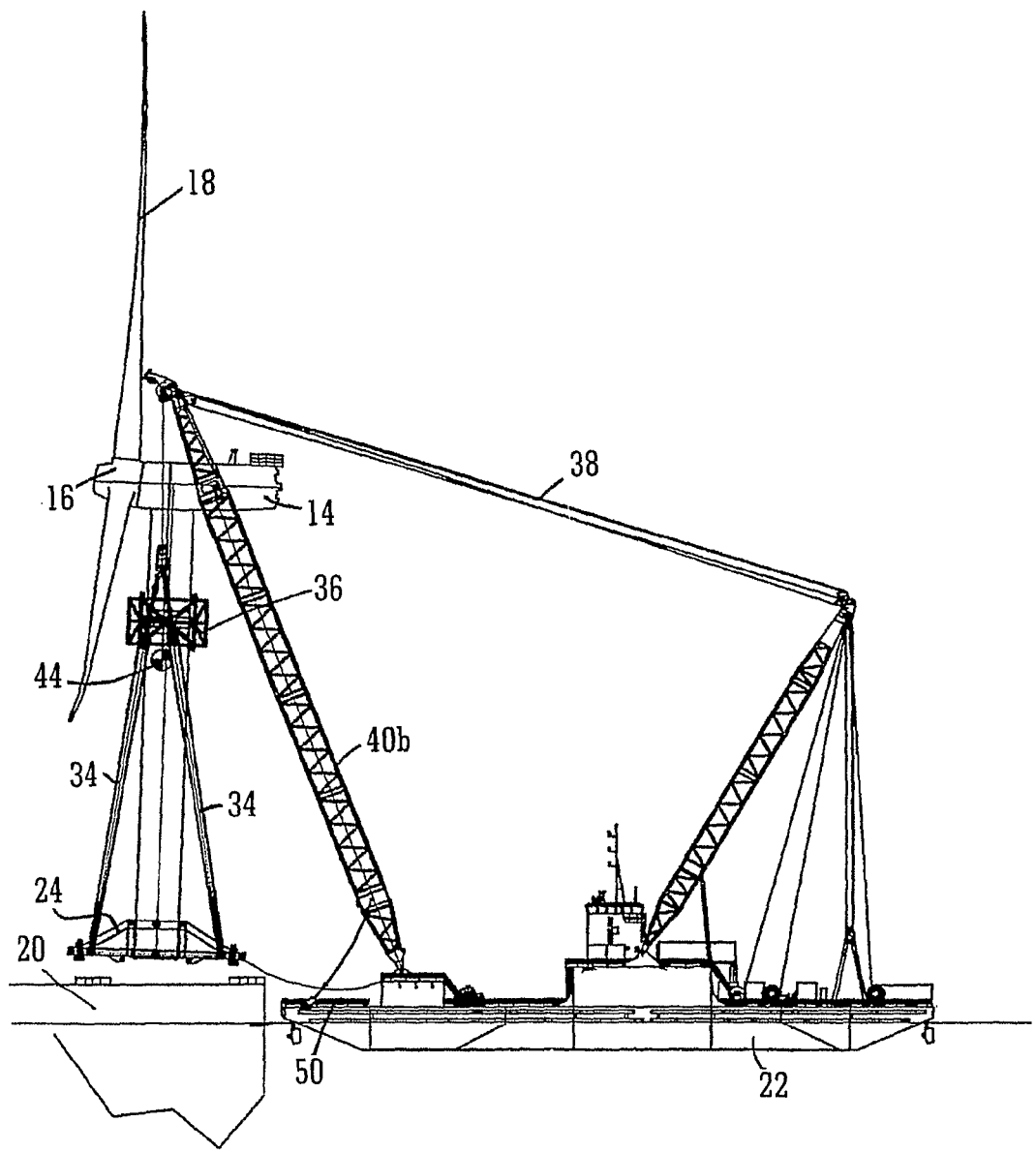
FIG. 2 shows a construction according to the invention where the offshore structure is in the process of being lifted onto a transporting vessel.
Figure 3A:
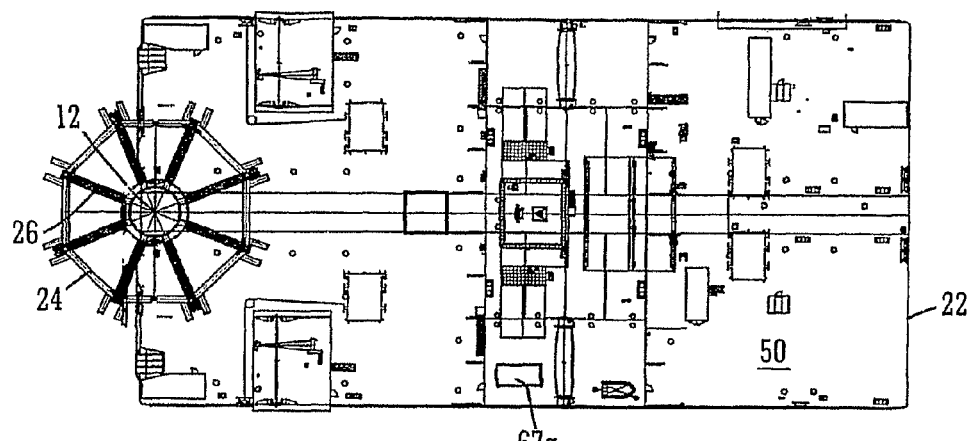
FIGS. 3A, 3B and 3C show respectively plan, side and end views of a construction according to the invention where the offshore structure is mounted for transit on the deck of a transporting vessel.
Figure 3B:
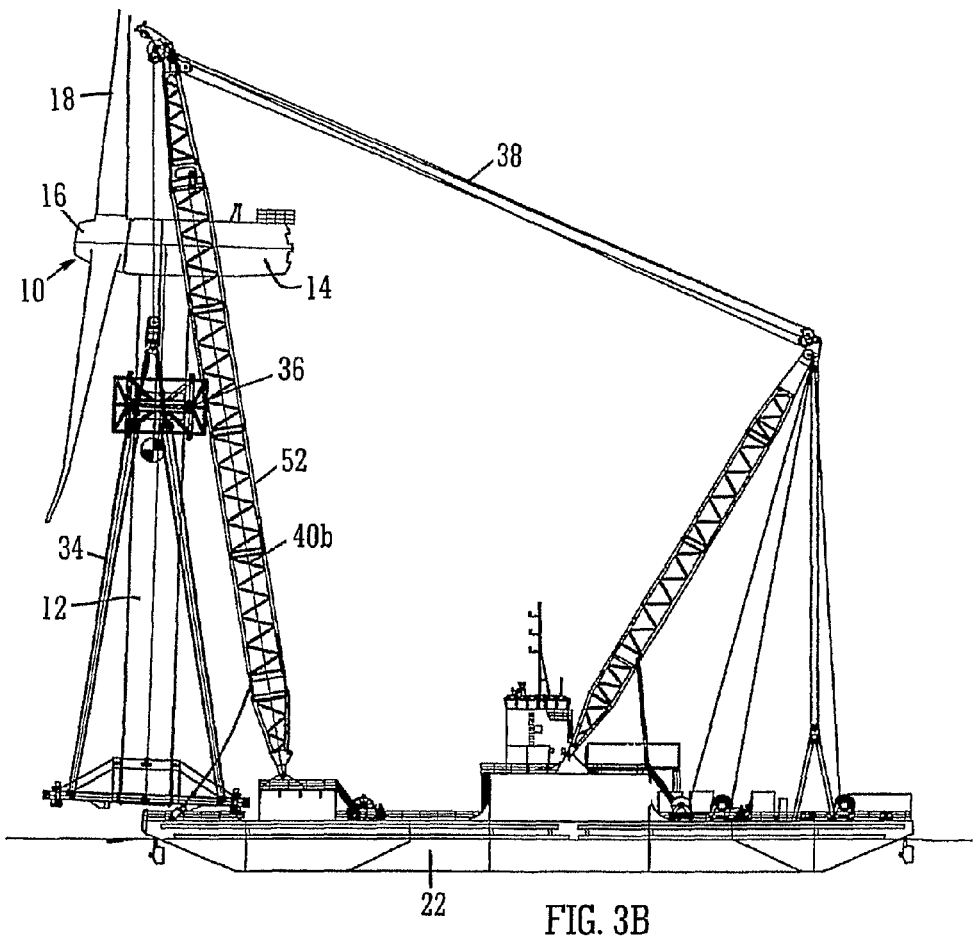
Figure 3C:
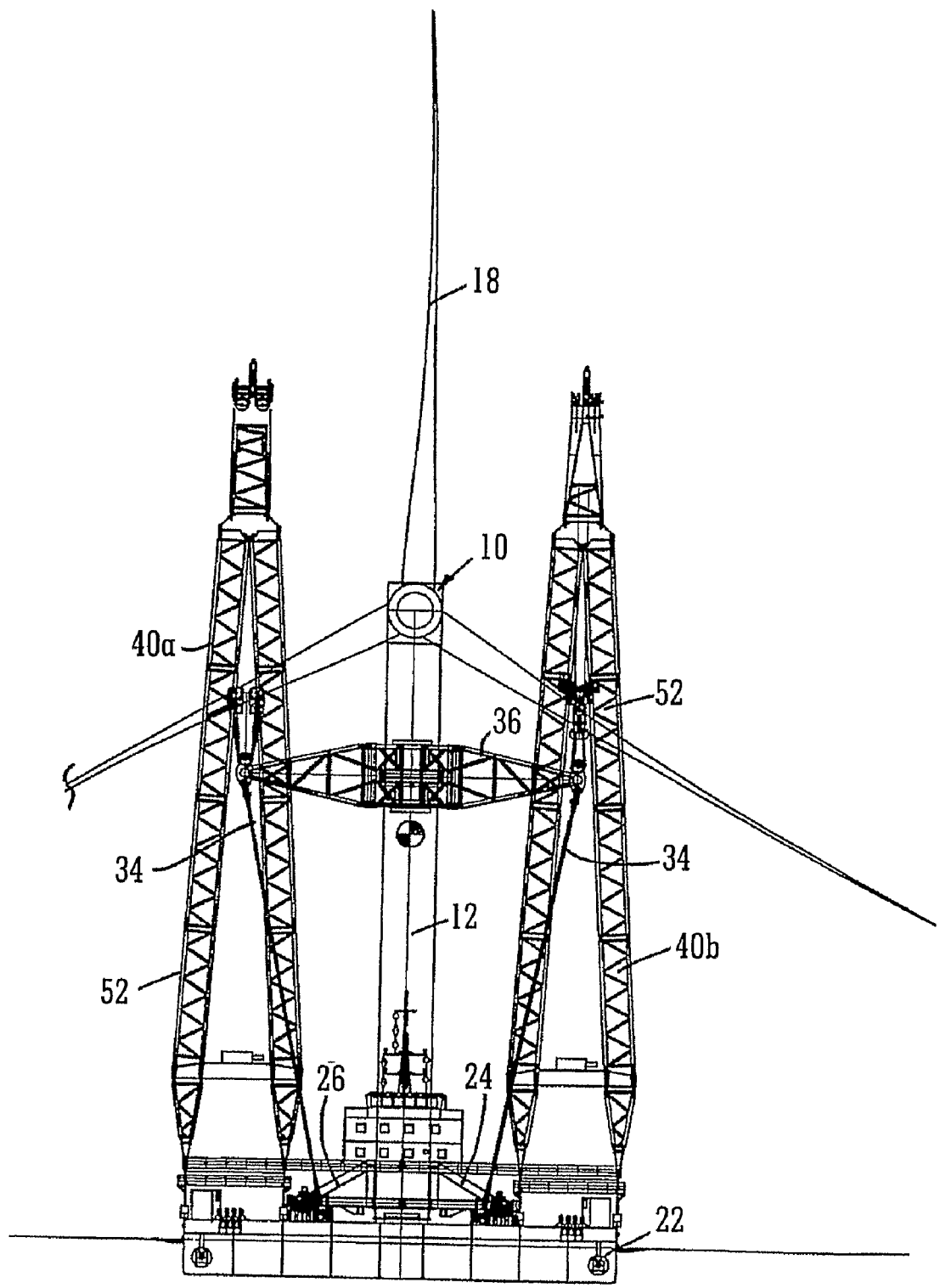
Figure 4A:
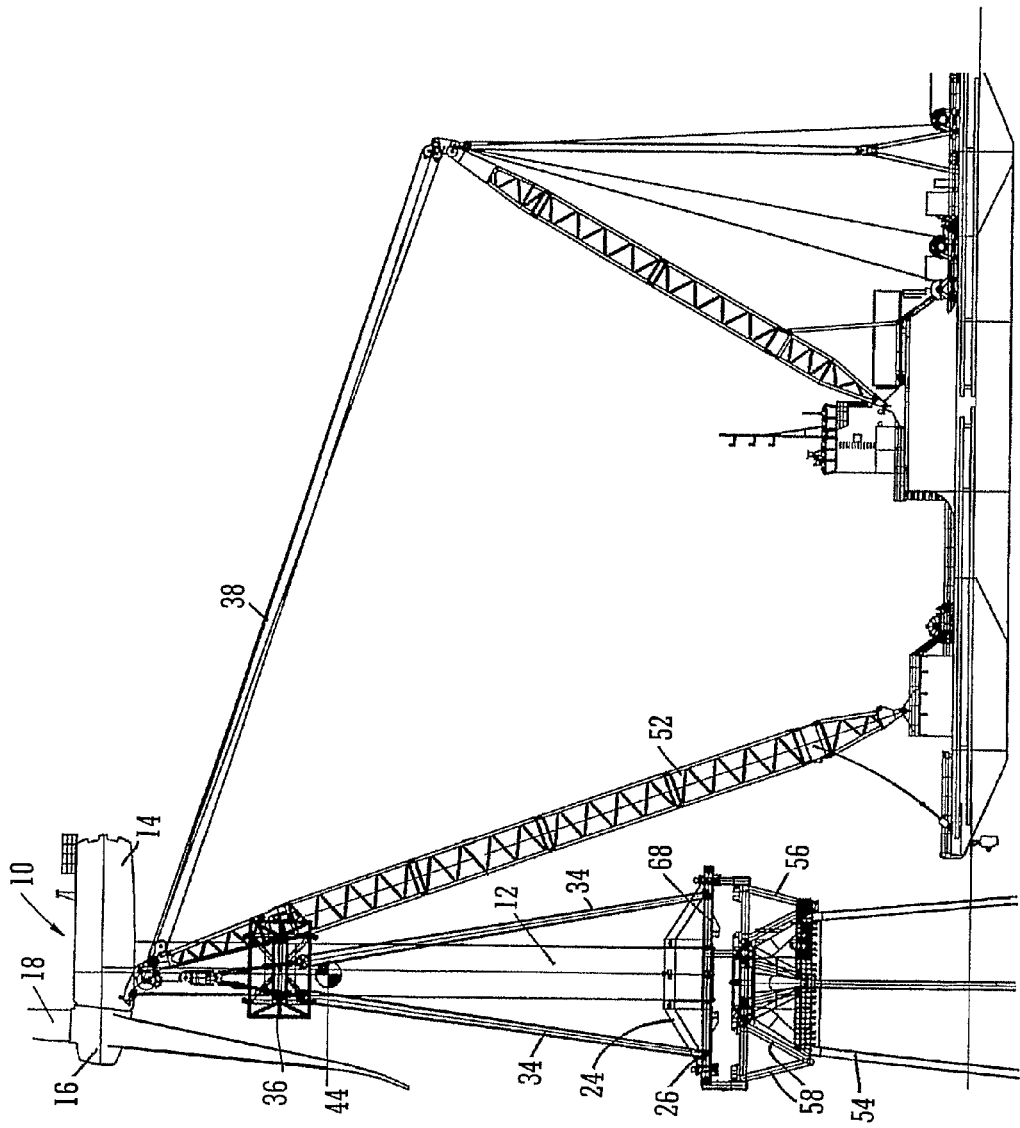
FIGS. 4A and 4B show respectively side and end views of a construction according to the invention, prior to mounting of the offshore structure on the offshore foundation.
Figure 4B:
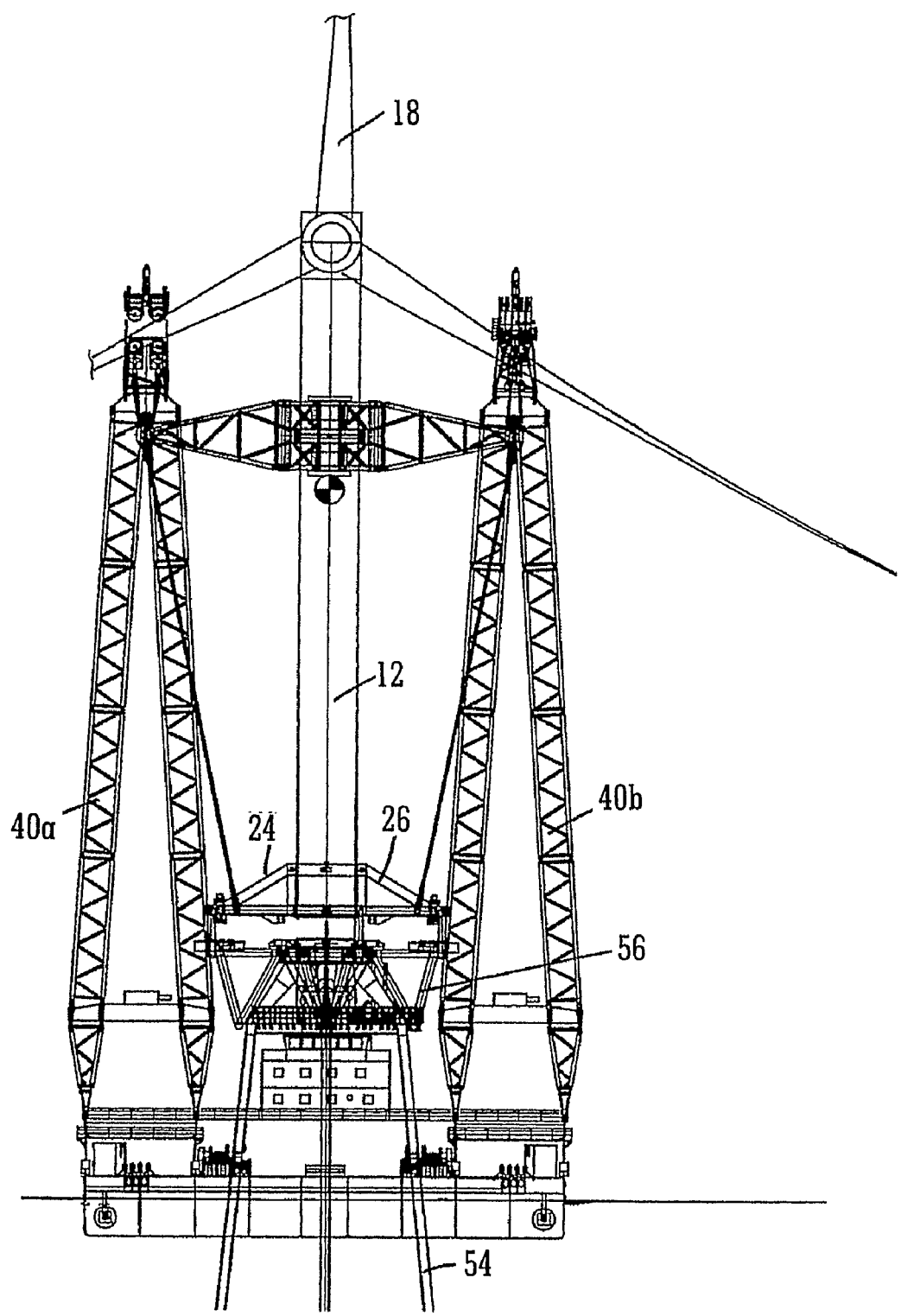
Figure 5:
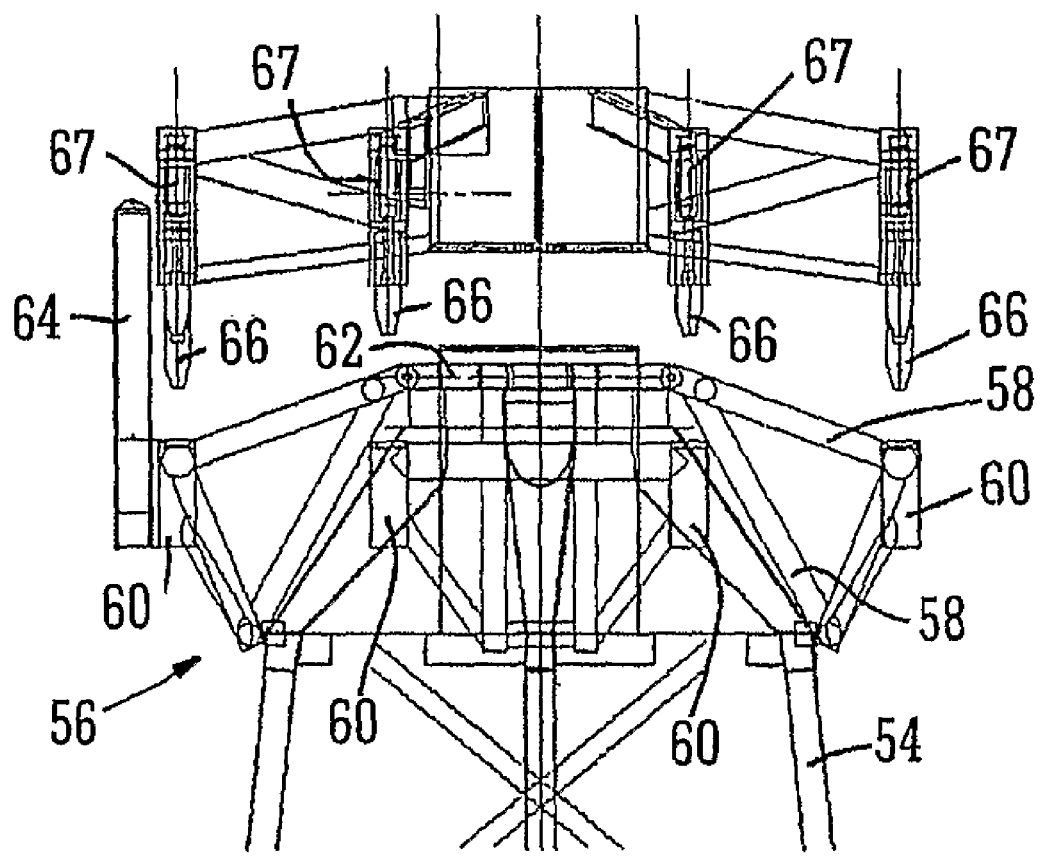
FIG. 5 is a detailed view showing aspects of the construction of the frame and the offshore support apparatus according to the invention.
Figure 6:
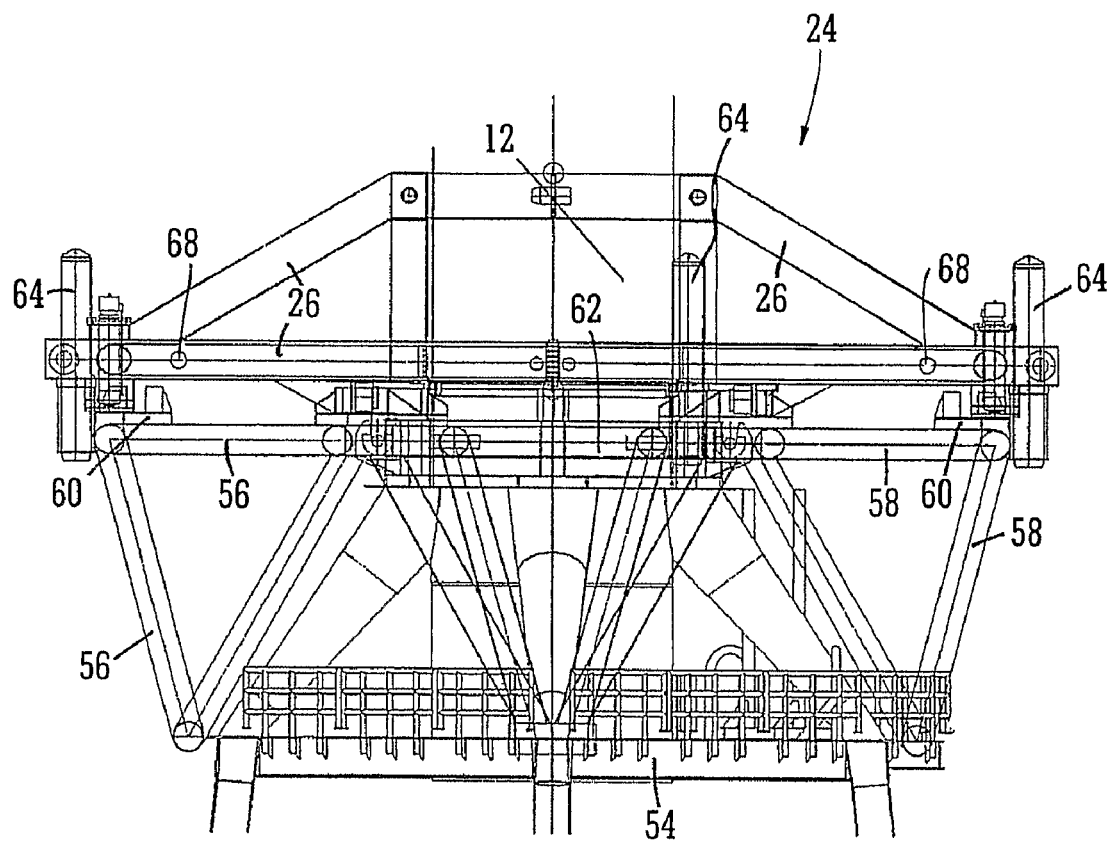
FIG. 6 is a detailed view showing aspects of the construction of the frame and the offshore support apparatus according to another embodiment of the invention.
Figure 7:
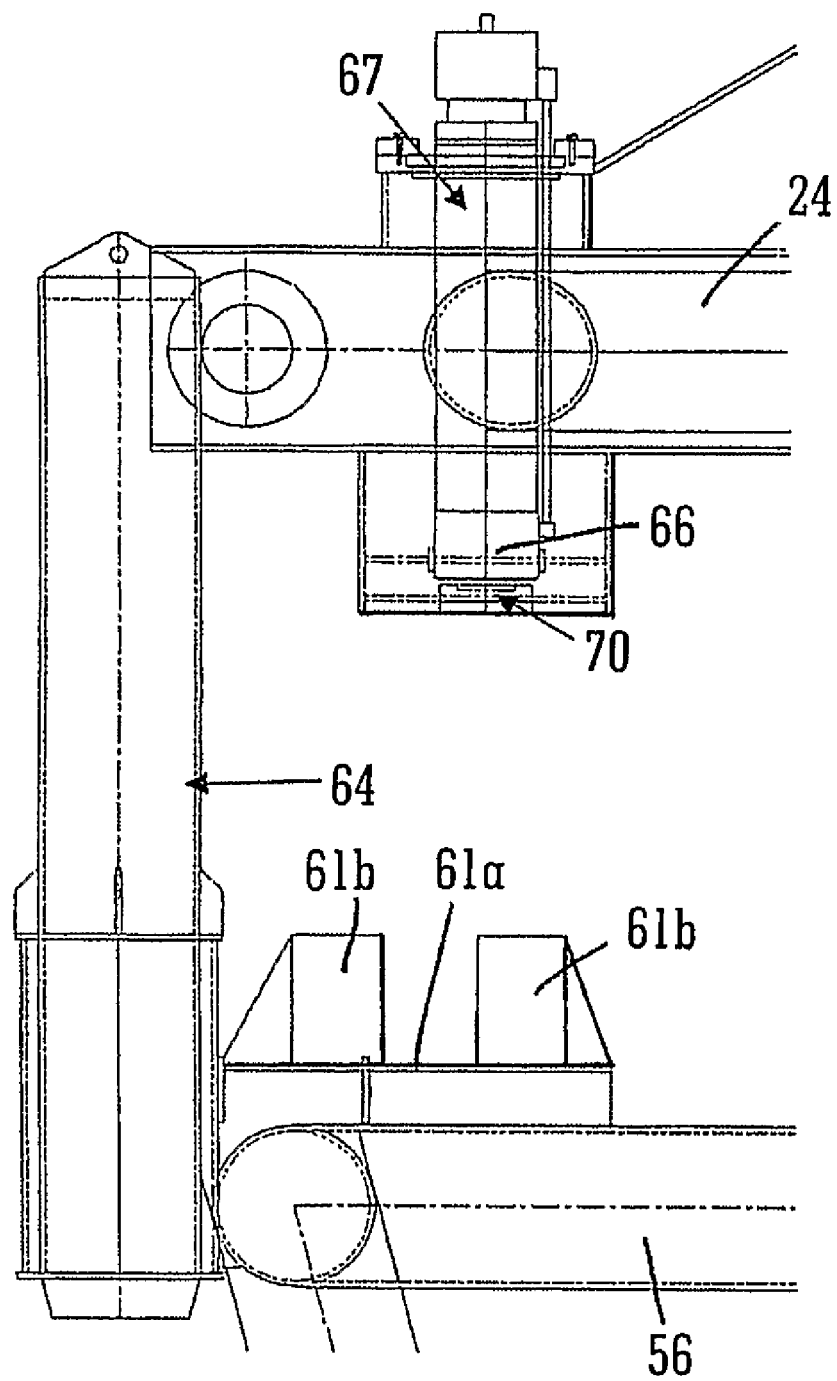
FIG. 7 is a more detailed view of the construction of FIG. 6, showing the tower supporting frame approaching the offshore support structure.
Figure 8A:
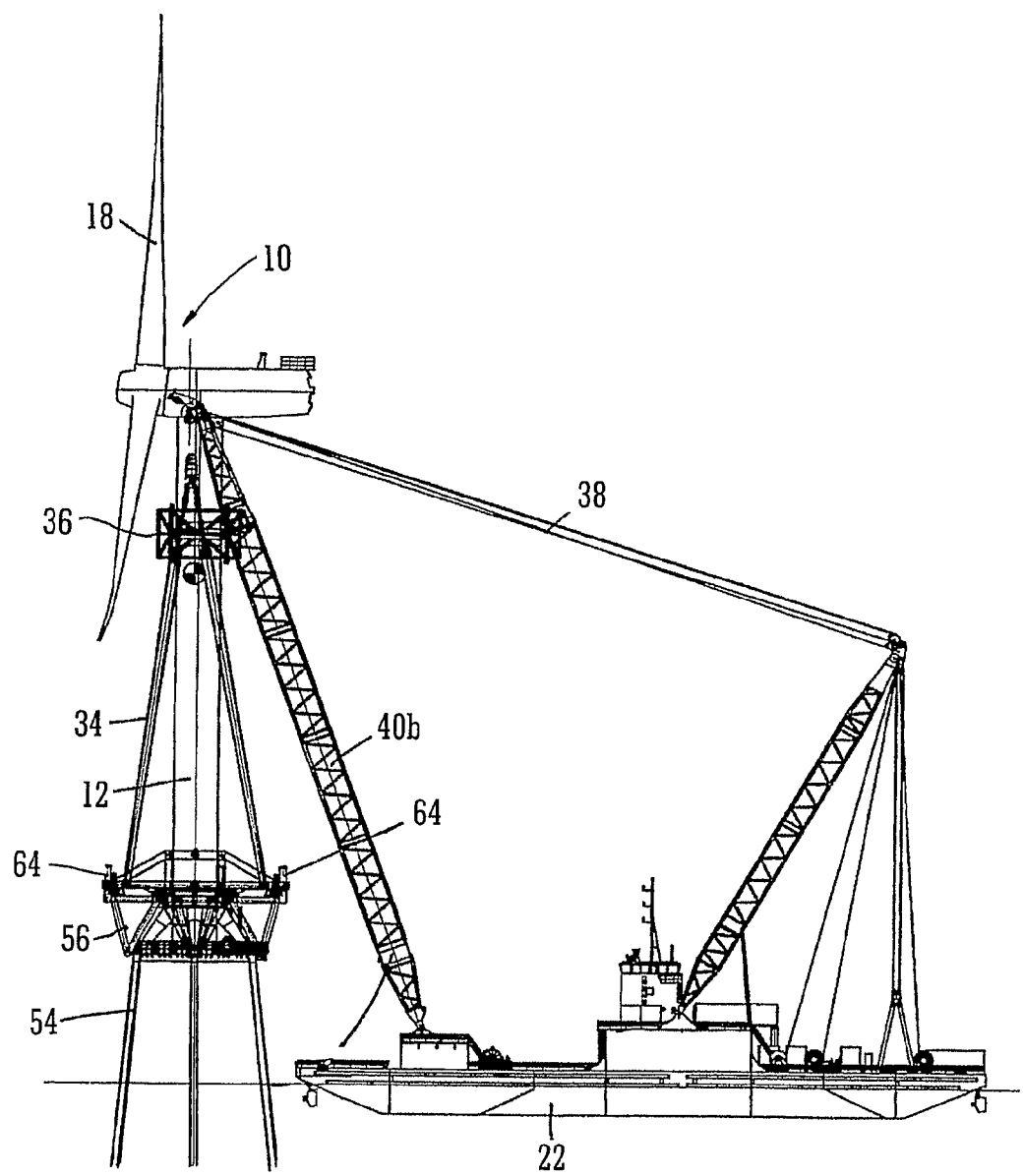
FIGS. 8A and 8B show respectively side and end view of the offshore structure when first mounted on the offshore foundation.
Figure 8B:
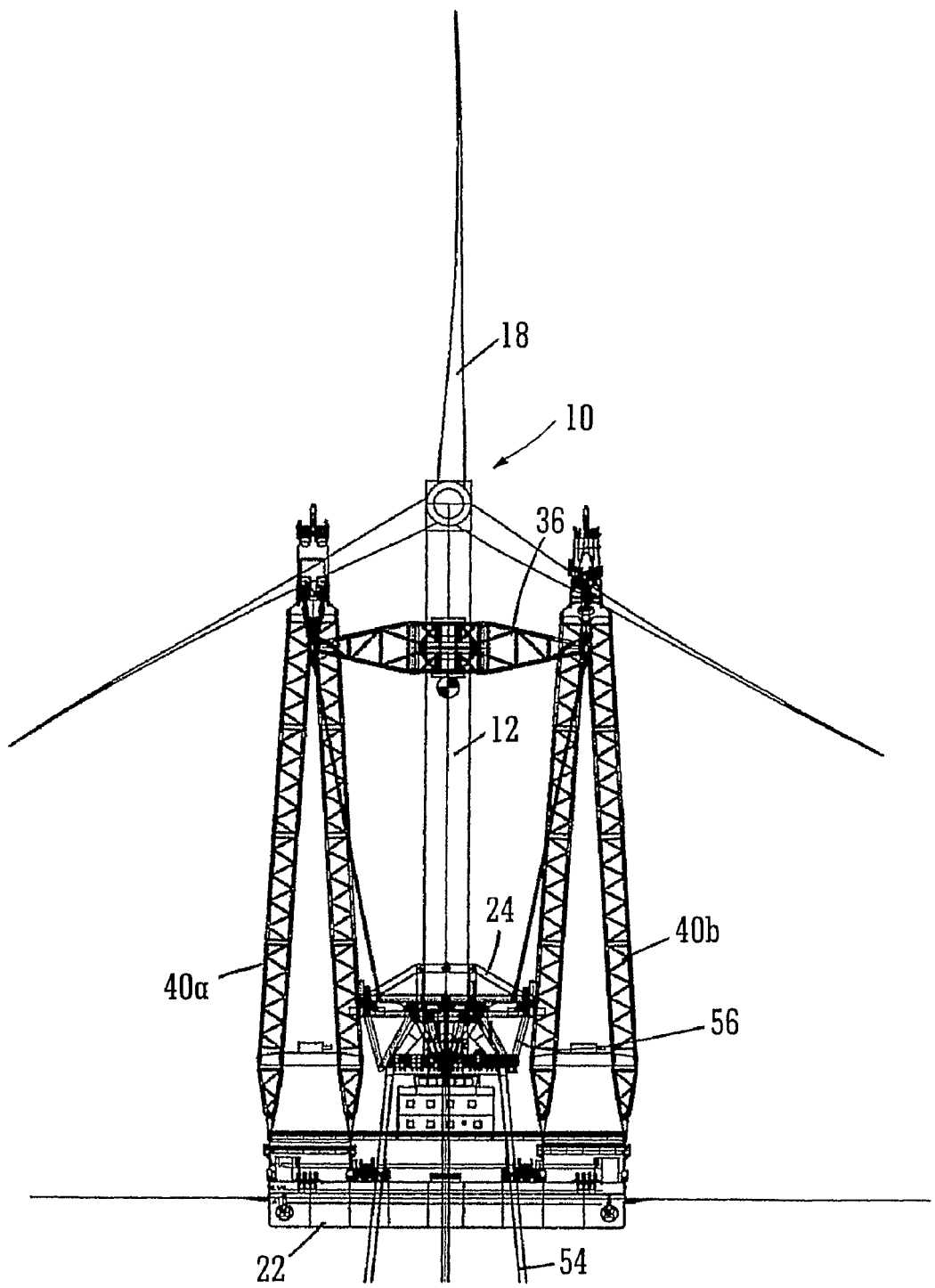
Figure 9A:
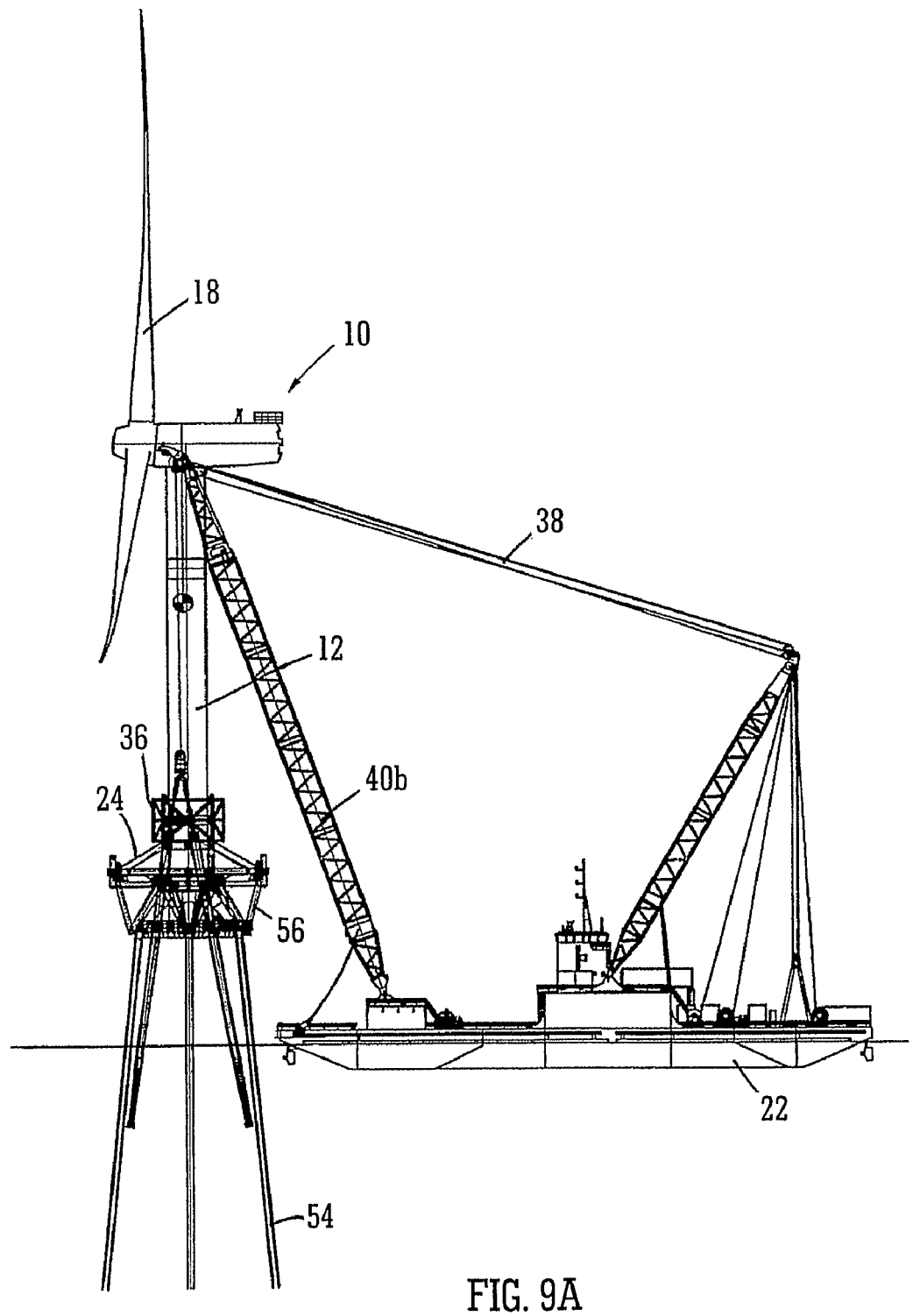
FIGS. 9A and 9B are respectively side and end views of a construction according to the invention at a stage after that shown in FIGS. 8A and 8B.
Figure 9B:
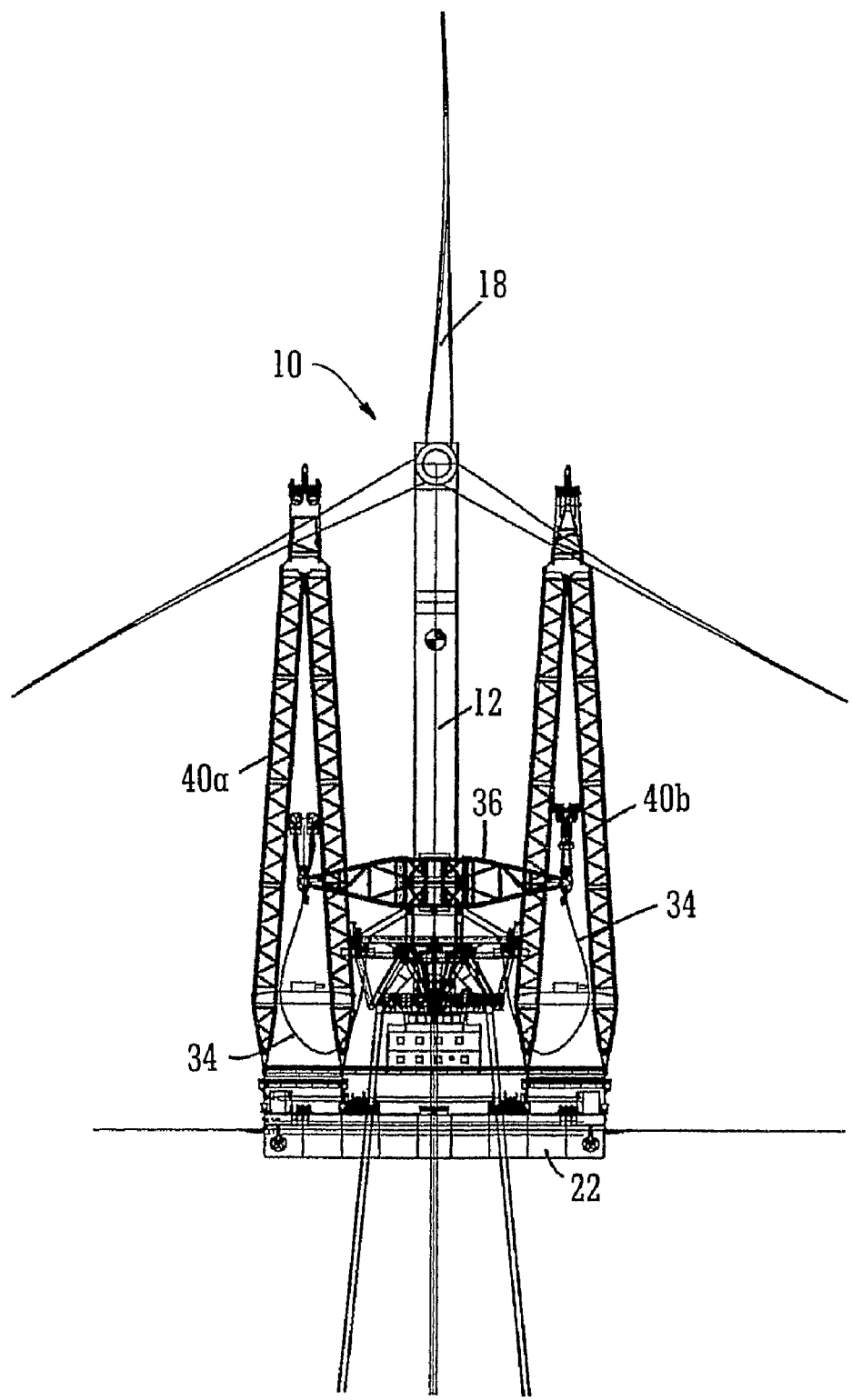
Figure 10:
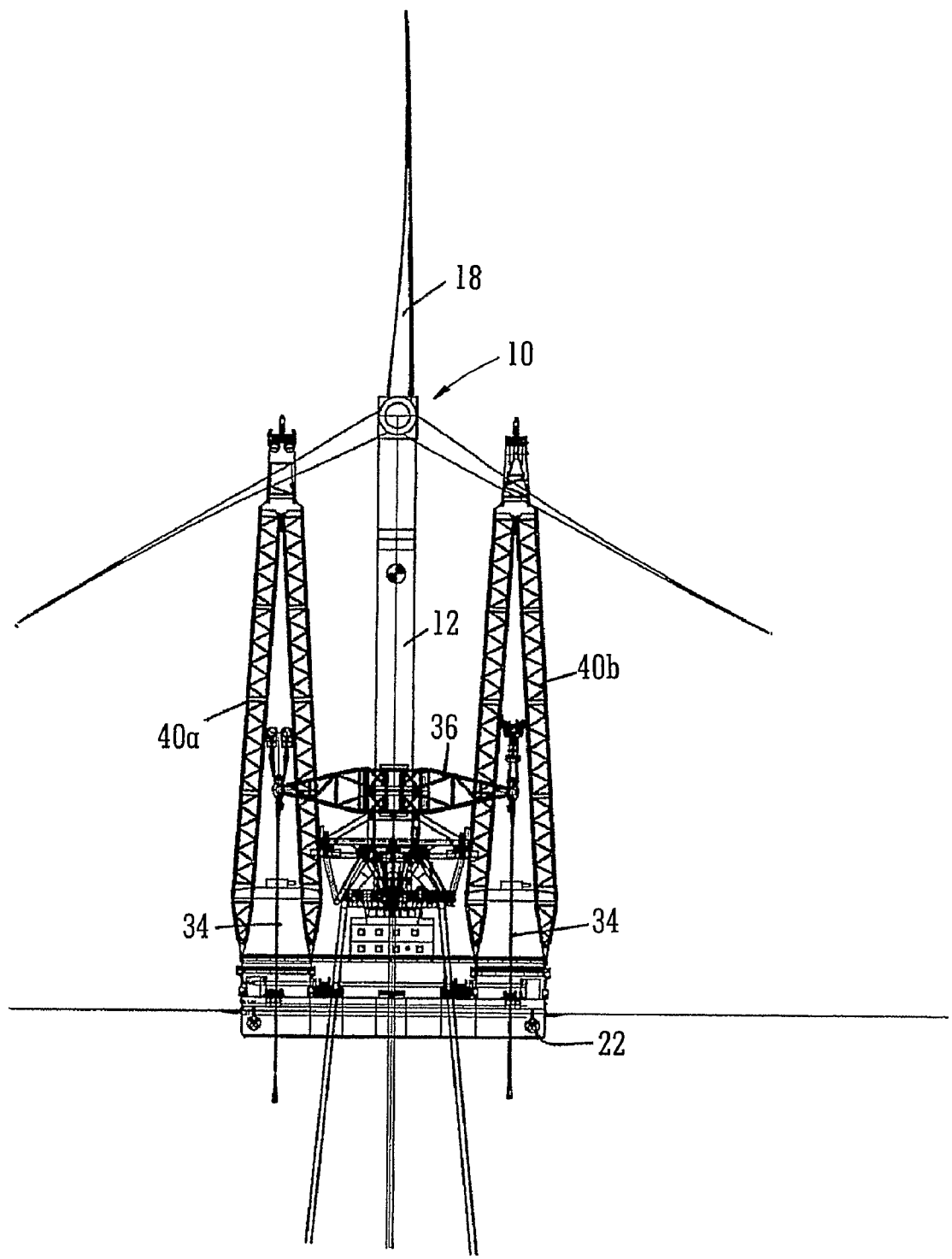
FIG. 10 shows and end view of a construction according to the invention at a stage subsequent to that shown in FIGS. 9A and 9B.

As can be seem in particular in FIG. 2, the tower supporting apparatus 24 including the frame 26 is lifted by means of the cranes 40a, 40b so that it is clear of the quayside 20 and is moved to the deck of the of the transporting vessel 22. As noted above, the frame 26 has a plurality of legs 30. In the illustrated embodiment the frame 26 is provided with eight legs 30. The supporting apparatus 24 is moved using the cranes 40a, 40b until some, but not necessarily all, of the legs 30 are brought into contact with the deck 50. FIG. 3A shows that in a referred embodiment four of the eight legs 30 are brought into contact with the deck 50. The supporting apparatus 24 thus rests on the deck 50. However, the cranes 40a, 40b continue to bear at least some, preferably most, and possibly substantially the entire load of the WTG 10 and supporting apparatus 24. The frame 26 is secured to the vessel 22 by suitable fastening means to restrain movement of the WTG 10 with respect to the vessel 22 and the booms 52 of the cranes 40a, 40b are moved aft (with respect to the vessel 22). The tower 12 of the WTG 10 is at this stage held substantially vertically, but need not be absolutely vertical. Note FIG. 3B where the tower 12 is shown with a small aft-wards inclination. Thus arrangement prevents large oscillations and loads developing during transit as the transporting vessel 22 pitches fore and aft under the action of waves of the sea.

The WTG 10 is transported to the work site where it is to be installed on the transporting vessel 22 in its upright condition as illustrated.

At the work site, the foundation, jacket or base 54 onto which the WTG 10 is to be mounted is pre-prepared by the provision of an offshore support apparatus 56. The offshore support apparatus 56 is secured (preferably removeably) to the foundation 54. Conveniently, the offshore support apparatus 56 includes a ring beam 62 which is mounted on a jacket transition piece, directly below the main flange of the jacket or foundation, to which the lower end of the WTG 10 is ultimately secured. The offshore support apparatus 56 is also a framework structure including a plurality of interconnecting members 58. On the framework there are arranged a number of supporting formations 60. The number of supporting formations 60 is equal to the number of legs 30 of the supporting apparatus 24, and the supporting formations 60 are configured each to receive a part of a respective leg 30, as will be explained below. The supporting formations 60 may preferably include a nominally horizontal substantially planar surface 61a, but may alternatively include a concavity such as a cup or bore into which the respective part of the leg 30 may be received. In a preferred form, the support formations 60 comprise said nominally horizontal surface and one or more movement limiting upstands 61b depending from one or more margins of the surface. The offshore support apparatus further includes one or more alignment members 64 which are used to provide coarse (that is, initial approximate) alignment of the tower supporting apparatus 24 with the offshore support structure.

In the most preferred embodiments of the invention, the tower supporting apparatus 24 includes on each leg 30 an adjustable foot or spigot 66. Each spigot 66 is moveable with respect to its respective leg 30 along a line of action which, when the WTG 10 is carried in the tower supporting apparatus 24, is substantially parallel to the longitudinal axis of the tower 12. That is, when the tower is nominally vertical, the line of action of each spigot 66 is also nominally vertical. The spigots 66 are thus extendable and retractable with respect to their legs 30 and suitable means are provided to effect such extension and retraction. The means may be mechanical but it is much preferred to use a hydraulic mechanism. Thus, each spigot 66 is connected to a hydraulic actuator 67 such as a piston and cylinder arrangement (hereinafter "hydraulic cylinder") which, by variation of the applied hydraulic pressure allows or causes extension or retraction of the spigot 66. In a variation, the spigot 66 is formed integrally with the hydraulic actuator, that is, the hydraulic actuator and the spigot are one and the same component. For example, the spigot 66 may be an outer end portion of the cylinder of the piston and cylinder arrangement. The movement of the hydraulic cylinders 67 is controlled by a hydraulic control means 67A, shown schematically in FIG. 3A, via a suitable control cable (not shown).

The control means 67A and associated hydraulic power unit (HPU) are preferably mounted on the transporting vessel 22. The hydraulic cylinders 67 are supplied with hydraulic fluid (oil) from the vessel-mounted HPU via an appropriate number of hydraulic hoses (not shown). Manifolds on the tower supporting apparatus 24 are controlled by the vessel mounted control means 67A. to distribute hydraulic fluid to the hydraulic cylinders 67 as required. In operation, the position of each spigot 66 is a function of both the applied hydraulic pressure in the hydraulic cylinder 67 and the load applied to the spigot 66, such load being that of the WTG 10 and the tower supporting apparatus 24 which in turn depends on the proportion of the load which is carried by cranes 40a, 40b at any given time. In preferred constructions, the leading end of each spigot 66 which in use is positioned to lie on the respective surface 61a is provided with a low friction surface such as a pad 70 of polytetrafluoroethylene (PTFE) or similar material.

For transferring the WTG 10 from the transporting vessel 22 and mounting the WTG 10 on the foundation 54, the transporting vessel 22 is first moored adjacent the foundation 54 and the fastening means by which the tower supporting apparatus 24 is secured to the deck 50 are released. The tower supporting apparatus 24, which carries the WTG 10, is lifted clear of the deck 50 of the transporting vessel 22 by the cranes 40a, 40b and maneuvered to a position above the foundation 54 by adjustment of the cranes 40a, 40b (preferably by adjustment of the booms of the cranes) and, where necessary, adjustment of position of the transporting vessel 22. The cranes 40a, 40b are selected to provide a clearance between the combined WTG 10 and tower support apparatus 24 and the offshore support apparatus 56 sufficient to accommodate movement of the vessel 22 caused by wave action. Typically the clearance is at least 1 m and preferably at least 1.5 m. The clearance between the WTG 10 and the foundation 54 is about 2 m when the above-mentioned clearance is 1.5 m. The alignment members 64 which are arranged in an upstanding configuration with respect to the offshore support apparatus are used to assist in guiding the tower supporting apparatus 24 into the correct alignment with the offshore support apparatus 56. Advantageously, the tower supporting apparatus includes corresponding alignment members 68 which are positioned to contact the alignment members 64 of the offshore support apparatus 56 during this initial alignment phase. Preferably the alignment members 68 form a "bumper ring" around the tower support apparatus 24. In another preferred feature, the mountings for the spigots and/or their hydraulic cylinders 67 are disposed outwardly of the alignment members 68 and can provide a fulcrum, in combination with the upright alignment members 64 of the offshore support apparatus, by which the rotational alignment of the tower supporting apparatus 24 (and consequently of the WTG 10) can be adjusted. For finer adjustment of the position of the WTG 10 with respect to the foundation 54, the tower supporting apparatus 24 is advantageously provided with an alignment system comprising further hydraulic actuators ("cylinders") which act to cause the spigots 66 to slide (by virtue of their low friction pads) on the horizontal surfaces 61a of the supporting formations 60. Typically six such hydraulic cylinders are provided, comprising four mounted near the centre of the frame 26 which provide horizontal translation of the WTG 10 and two mounted at two respective spigots 66 to provide rotational adjustment.

When the tower supporting apparatus 24 is in the correct alignment, each spigot 66 is disposed directly above a corresponding supporting formation 60. Upstands 61b of the supporting formations 60 assist in the alignment process by resisting movement of the tower supporting structure 24 which would move the spigots 66 beyond their respective horizontal surfaces 61*a*.

At, or prior to, this stage, the hydraulic control means 67A is used to fully extend the hydraulic cylinders 67 and consequently the spigots 66, but under a relatively low pressure, so that there is only a relatively small resistance to retraction of the spigots 66 under an applied load and so that the spigots will extend again on removal of the load. The cranes 40*a*, 40*b* are used to lower the tower supporting structure 24 until the spigots 66 come into contact with the supporting formations 60. Given that the transporting vessel 22 is subject to the action of waves, it can be appreciated that initially some or all of the spigots 66 may make intermittent contact with their corresponding supporting formations 60, as the transporting vessel 22 rises and falls. The spigots 66 can accommodate falling motion of the vessel by retracting, since the relatively low hydraulic pressure in the hydraulic cylinders permits this. The cranes 40*a*, 40*b* continue to lower the tower supporting apparatus 24 until all the spigots 66 remain in contact with their respective supporting formation 60 throughout the wave cycle. At this stage, the control means 67A for the hydraulic cylinders is adjusted to a second mode in which there is more resistance to retraction of the spigots 66 so that they can be retracted only under a relatively high load (if at all), but only a relatively low load is required for extension of the spigots 66. As the transporting vessel 22 rises on a wave the hydraulic cylinders, and consequently the spigots 66, extend. As the transporting vessel 22 begins to fall into the next wave trough the spigots 66 and cylinders 67 carry the full weight of the tower supporting apparatus 24 and the WTG 10 so that in this part of the wave cycle all of the load is carried by the offshore support apparatus 56, through the supporting formations 60. As the cranes 40*a*, 40*b* continue to lower the tower supporting apparatus 24, all of the spigots 66 remain in contact with their respective supporting formations 60 and the load of the WTG 10 is carried in varying proportions by the cranes 40*a*, 40*b* and the offshore support apparatus 56, as the vessel 22 is subject to wave motion. As the crane 40*a*, 40*b* continue to pay out the load is progressively transferred from the cranes 40*a*, 40*b* onto the offshore support apparatus 56 until no load is carried by the cranes 40*a*, 40*b*.

The cranes 40*a*, 40*b* continue their lowering operation until the lifting slings 34 become slack. Thus, the hydraulic cylinders 67 and spigots 66 provide a damping and stabilising system which controls and mitigates the contact forces between the tower supporting apparatus 24 and the offshore support apparatus 56. After final alignment of the WTG 10 with the foundation, the hydraulic pressure in the cylinders 67 is reduced so that the WTG 10 is lowered onto the foundation 54 and suitably secured. Commonly, the WTG 10 and the foundation comprise complementary flanges and the WTG 10 is secured to the foundation by bolting the flanges together. In this case, the bolts may inserted into the flanges before the WTG 10 is finally lowered onto the foundation 54 by allowing the spigots 66 to retract. The bolts are secured after the WTG 10 is lowered into its final position. Other methods of securing may, of course, be used.

Figure 11A:
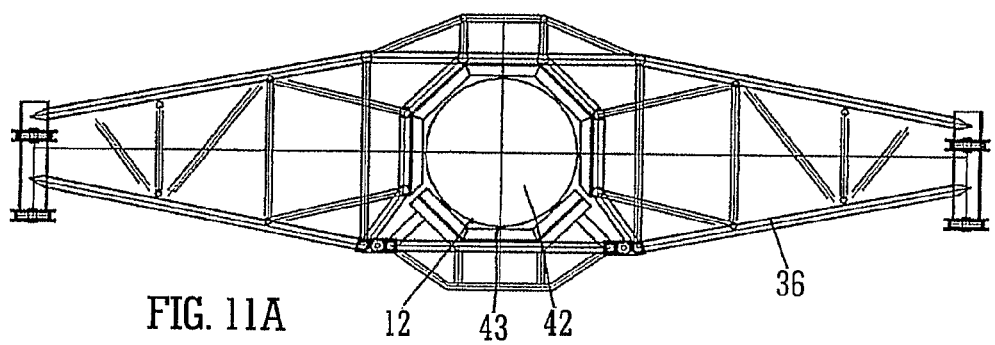
FIGS. 11A, 11B and 11C show respectively plan, side and end views of a spreader beam used in the construction according to the invention.
Figure 11B:
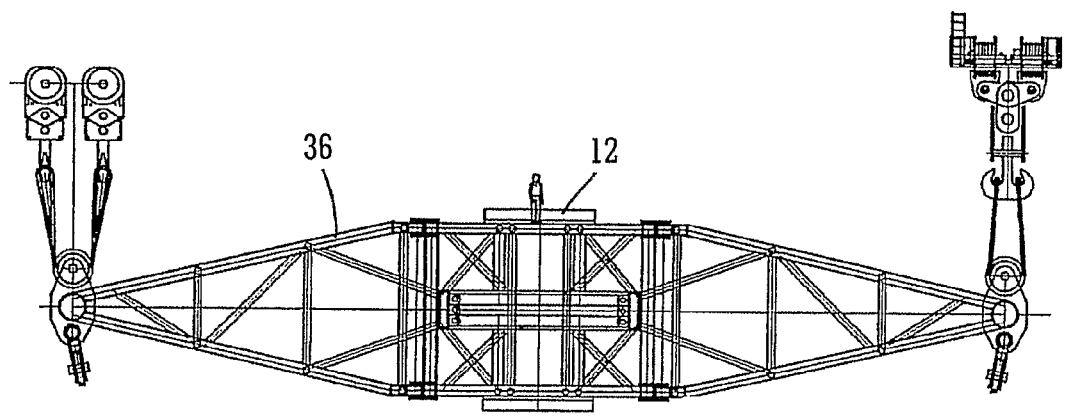
Figure 11C:
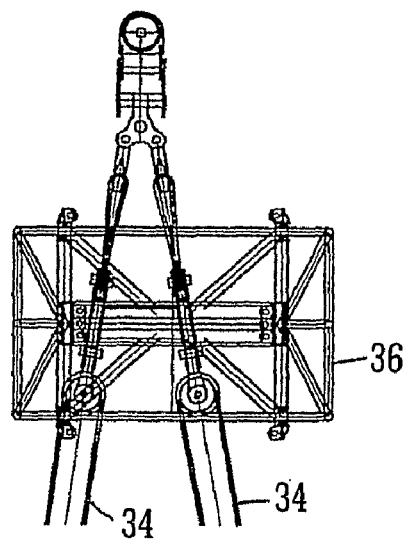

When the WTG 10 is supported by the offshore support apparatus 56, and preferably prior to the final lowering of the WTG 10 onto the foundation 54, the cranes 40*a*, 40*b* continue their lowering operation so that the spreader beam 36 is lowered and hence moves parallel to the longitudinal axis of the tower 12. The spreader beam 36 is lowered until it rests on the tower supporting apparatus 24. Lowering of the spreader beam in this way reduces the risk that the transporting vessel 22 might overturn should it move off-station for any reason prior to disengagement of the lifting apparatus from the tower support structure 24. The lowered position of the spreader beam 36 is illustrated in particular in FIGS. 11A, 11B and 12. As may be seem from FIG. 12, the lifting slings 34 can then be detached from the tower supporting structure 24.

When the WTG 10 is secured in its final position of use, the spreader beam 36 is recovered to the transporting vessel 22. For this step, the spreader beam 36 is suitably attached to canes 40*a*, 40*b* or other available lifting apparatus, the opening section 46 is released and opened about hinges 48 and the spreader beam is lifted onto the vessel 22. The tower supporting structure is 24 is also recovered by disconnecting it from the tower 12 and using lifting equipment such as cranes 40*a*, 40*b* to transfer it to transporting vessel 22. The offshore support apparatus 56 is also recoverable, at least in part. The offshore support apparatus 56 may be lifted onto the vessel 22 in, for example, two or more sections. It may be convenient not to recover the ring beam 62 which then remains attached to the foundation 54. The alignment members 64 may be separately removable, prior to the disassembly of the remainder of the offshore support apparatus.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Apparatus for transporting an offshore structure including a longitudinally extensive shaft, mast or tower and for mounting the offshore structure on an offshore support base, the apparatus comprising:
   a frame including an engaging portion configured to engage the shaft, mast or tower, a plurality of legs configured to rest on an underlying supporting surface and a plurality of lifting formations by which the frame may operatively be lifted, each leg including an adjustable foot, the frame being configured to support and carry the offshore structure with the shaft, mast or tower in a substantially upright condition;
   a transporting vessel;
   a control arrangement operable to control the movement of each foot; and
   a pair of lifting cranes mounted on the vessel, the lifting cables of the cranes being operatively connected to the lifting formations of the frame, whereby the offshore structure, carried in the frame may operatively be lifted from land onto the vessel;
   wherein each foot is moveable between an extended condition and a retracted condition; and
   wherein each foot is moveable with respect to its respective leg.

2. Apparatus as claimed in claim 1 further comprising a spreader beam operatively arranged above the centre of gravity of the combined offshore structure and frame, the spreader beam being attached to the lifting cables of the crane and operatively moveable with respect to the longitudinal dimension of the shaft, mast or tower.

3. Apparatus as claimed in claim 2 wherein the shaft, mast or tower of the offshore structure passes through the spreader beam.

4. Apparatus as claimed in claim 1, wherein each foot moves along a line of action, the lines of action of the respective feet being parallel and nominally vertical when the offshore structure is supported with the shaft, mast or tower in its upright condition.

5. Offshore support apparatus for use in mounting in or on an offshore foundation an offshore structure including a longitudinally extensive shaft, mast or tower, the offshore structure being operatively carried with the shaft, mast or tower in a substantially upright condition in a frame including an engaging portion configured to engage the shaft, mast or tower, a plurality of legs configured to rest on an underlying supporting surface and a plurality of lifting formations by which the frame may operatively be lifted, the offshore support apparatus comprising attachment means configured operatively to attach the offshore support apparatus to the offshore foundation, a support frame depending from the attachment means and a plurality of supporting formations equal in number to the number of legs of the frame and configured to support respective legs of the frame;
wherein each leg includes an adjustable foot;
wherein each foot is moveable between an extended condition and a retracted condition; and
wherein each foot is moveable with respect to its respective leg by a control arrangement operable to control the movement of each foot.

6. System for mounting, in or on an offshore foundation, an offshore structure including a longitudinally extensive shaft, mast or tower, the system comprising:
a frame including an engaging portion configured to engage the shaft, mast or tower, a plurality of legs configured to rest on an underlying supporting surface and a plurality of lifting formations by which the frame may operatively be lifted, the frame being configured to support and carry the offshore structure with the shaft, mast or tower in a substantially upright condition;
an offshore support apparatus comprising attachment means configured operatively to attach the offshore support apparatus to the offshore foundation; and
a support frame depending from the attachment means and a plurality of supporting formations equal in number to the number of legs of the frame and configured to support respective legs of the frame;
wherein each leg includes an adjustable foot, each foot being moveable between an extended condition and a retracted condition;
wherein each foot is moveable with respect to its respective leg; and
wherein the frame further comprises a control arrangement operable to control the movement of each foot, the feet of the frame and the supporting formations of the offshore support apparatus being configured so that the feet are supported by the supporting formations when the offshore structure is mounted in its operative position.

7. System as claimed in claim 6 further comprising:
a transporting vessel; and
a pair of lifting cranes mounted on the vessel, the lifting cables of the cranes being operatively connected to the lifting formations of the frame, whereby the offshore structure, carried by the frame, may operatively be lifted from land onto the vessel and from the vessel onto the offshore support foundation.

8. System as claimed in claim 6 further comprising a spreader beam operatively arranged above the centre of gravity of the combined offshore structure and frame, the spreader beam being attached to the lifting cables of the crane and operatively moveable with respect to the longitudinal dimension of the shaft, mast or tower.

9. System as claimed in claim 8 wherein the shaft, mast or tower of the offshore structure passes through the spreader beam.

10. System as claimed in claim 6, wherein each foot moves along a line of action, the lines of action of the respective feet being parallel and nominally vertical when the offshore structure is supported with the shaft, mast or tower in its substantially upright condition.

11. System as claimed in claim 6 wherein the offshore support apparatus further includes alignment means which operatively cooperate with the frame to assist in the alignment the legs and the supporting formations.

12. A method of mounting an offshore structure including a longitudinally extensive shaft, mast or tower on a transporting vessel, the method comprising:
providing on land a frame including an engaging portion configured to engage the shaft, mast or tower, a plurality of legs configured to rest on an underlying supporting surface and a plurality of lifting formations by which the frame may operatively be lifted, wherein each leg includes an adjustable foot that is moveable between an extended condition and a retracted condition;
moving each foot with respect to its respective leg by a control arrangement;
securing the frame to the offshore structure;
providing a pair or lifting cranes on the transporting vessel, each crane having a lifting cable;
connecting the lifting cables to the lifting formations of the frame; and
lifting the frame carrying the offshore structure from the land to the vessel such that at least some of the legs are supported by the deck of the vessel and the offshore structure is retained in a substantially upright condition at least partially by the action of the cranes.

13. A method as claimed in claim 12 further comprising:
before the step of lifting the frame, providing a spreader beam, mounting the spreader beam on the shaft, mast or tower and attaching the lifting cables of the cranes to the spreader beam such that the spreader beam may operatively be moved longitudinally with respect to the shaft, mast or tower.

14. A method of transferring an offshore structure including a longitudinally extensive shaft mast or tower from a transporting vessel to an offshore support foundation, the method comprising
providing:
a tower supporting apparatus including a frame arranged on the vessel and supporting the offshore structure, the frame comprising an engaging portion which engages the shaft, mast or tower, a plurality of legs at least some of which are supported on the deck of the vessel and a plurality of lifting formations by which the frame may operatively be lifted, wherein each leg includes an adjustable foot, each foot being moveable between an extended condition and a retracted condition, wherein the frame further comprises a control arrangement operable to control the movement of each foot, and wherein each foot is moveable with respect to its respective leg;
a pair or lifting cranes on the transporting vessel, each crane having a lifting cable connected to the lifting formations of the frame;

a spreader beam mounted on the shaft, mast or tower and to which the lifting cables of the cranes are attached, the spreader beam being operatively moveable longitudinally with respect to the shaft, mast or tower;

an offshore support apparatus comprising attachment means by which the offshore support apparatus is attached to the offshore foundation, a support frame depending from the attachment means and a plurality of supporting formations equal in number to the number of legs of the frame and configured to support respective legs of the frame the method comprising:

lifting the tower supporting apparatus and offshore structure from the vessel with the cranes and retaining the offshore structure with the shaft, mast or tower in a substantially upright configuration;

moving the tower supporting apparatus carrying the offshore structure to a position above the offshore support foundation and aligning the legs of the frame with the support structures of the offshore support apparatus;

lowering the offshore structure onto the offshore support base such that the legs are supported by the supporting formations of the offshore support apparatus; and securing the offshore structure to the offshore support apparatus.

15. A method as claimed in claim 14 further comprising:

allowing each foot to extend and retract substantially freely as the offshore structure is lowered to the offshore support apparatus until each foot remains in contact with the corresponding support formation of the offshore support apparatus; and adjusting the control arrangement such that retraction of the feet is restricted or prevented, whereby the load of the offshore structure is transferred to the offshore support apparatus.

* * * * *